July 18, 1933.  H. E. McCRAY  1,919,069

TRACTOR

Filed April 8, 1929  4 Sheets-Sheet 1

July 18, 1933.  H. E. McCRAY  1,919,069
TRACTOR
Filed April 8, 1929  4 Sheets-Sheet 4

Inventor.
Harold E. McCray
By Brown, Jackson, Boettcher & Dienner
Attorneys.

Witness
Milton Lenoir

Patented July 18, 1933

1,919,069

UNITED STATES PATENT OFFICE

HAROLD E. McCRAY, OF WATERLOO, IOWA, ASSIGNOR TO JOHN DEERE TRACTOR COMPANY, OF WATERLOO, IOWA, A CORPORATION OF IOWA

TRACTOR

Application filed April 8, 1929. Serial No. 353,374.

The present invention relates to tractors, and more specifically to tractor engines.

Considered broadly, the invention aims to provide an improved engine of the Diesel type, which engine will have particular application to tractor propulsion.

Considered more specifically, it is one of the objects of the invention to embody the Diesel principle of operation in a previously existing design of tractor without necessitating radical or extensive changes in such design. The design of tractor referred to has been in successful commercial use for many years and the fundamental features of design of the spark ignition engine employed therein, and of the other tractor parts directly related to the engine, represent extensive experimental and development work resulting in a design the efficiency and reliability of which have been proven by long continued service in the field.

Hence, in adapting the Diesel principle of operation to this tractor, it has been one of the objects of the invention to provide a construction which will utilize as much as possible the fundamental features of this previous design, both for the purpose of utilizing proven structural features, as well as avoiding the cost of re-designing the tractor.

Another object of the invention is to provide a construction wherein the majority of the moving parts of the Diesel design are enclosed within the engine structure so that they will be removed from the abrasive action of dust and dirt, such being of particular importance in a farm tractor where the wear producing action of dust and dirt is present to a large degree.

Another object of the invention is to provide improved and simplified mechanism for operating the injector valves, and improved and simplified means for placing the operation of said injector valves under the control of a speed regulating governor.

Other objects and advantages of the invention will be pointed out in detail in the following description of a preferred embodiment thereof.

In the accompanying drawings illustrating such embodiment:—

Figure 1:
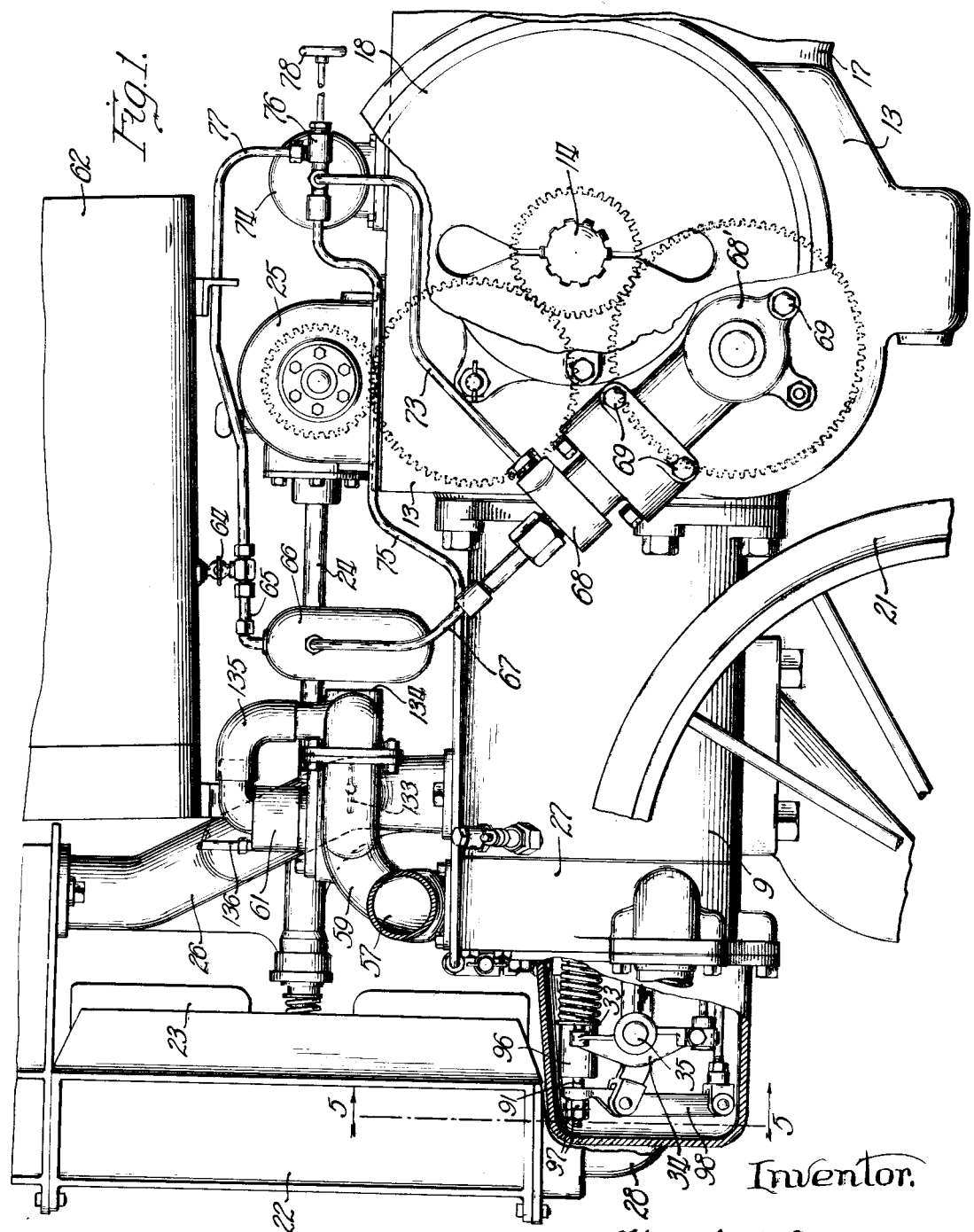
Fig. 1 is a fragmentary side elevational view of the front portion of the tractor illustrating the Diesel features embodied in the engine, the front cover plate enclosing the valve and injector mechanism being broken away to illustrate these parts.

The general design of tractor in which the present invention has been embodied is disclosed in the patent of Louis W. Witry, No. 1,702,371, granted February 19, 1929. Briefly described, the tractor comprises the engine 9 which is of the horizontal type having two cylinders 11 (Fig. 2) formed in a single cylinder block 12.

The engine is disposed at the front end of the tractor, and the cylinder block 12 extends forwardly from the front side of a crank case 13, in which the crank shaft 14 is mounted. The pistons 15 have the usual operative connection with the crank shaft 14 through the connecting rods 16. Extending rearwardly from the crank case 13 is a housing 17, fragmentarily illustrated in Fig. 1, in which housing is enclosed the selective speed mechanism, the differential, and other drive mechanism for transmitting the power of the engine to the rear traction wheels. This portion of the tractor design does not enter into the present invention and, hence, need not be described. The transversely extending crank shaft 14 has bearing support in the side walls of the crank case 13 (Fig. 3), supporting a fly-wheel 18 on one outwardly projecting end and having its other outwardly projecting end operatively connected through a clutch with the aforementioned power transmission mechanism in the housing extension 17.

The front portion of the engine 9 has bracket support on a front axle on which the front wheels 21 are mounted. A cooling radiator 22 extends upwardly from the front portion of the engine, and a fan 23 is mounted behind this radiator on a fan shaft 24 extending rearwardly over the top of the cylinder block. The rear end of said shaft enters a housing 25 mounted on top of the crank case 13, in which housing driving connection is established with the fan shaft.

The water jacket of the cylinder block 12 communicates with a tubular standard 26 through which the cooling water passes upwardly to the upper portion of the radiator 22, said tubular standard also affording a bearing support for the front end of the fan shaft 24. The cylinder block has a removable head 27 having jacket space communicating with the water jacket of the cylinder block. The water passes out of the lower end of the radiator into two conduits 28 (Fig. 5) which connect with the jacket space in the removable head 27.

Figure 3:
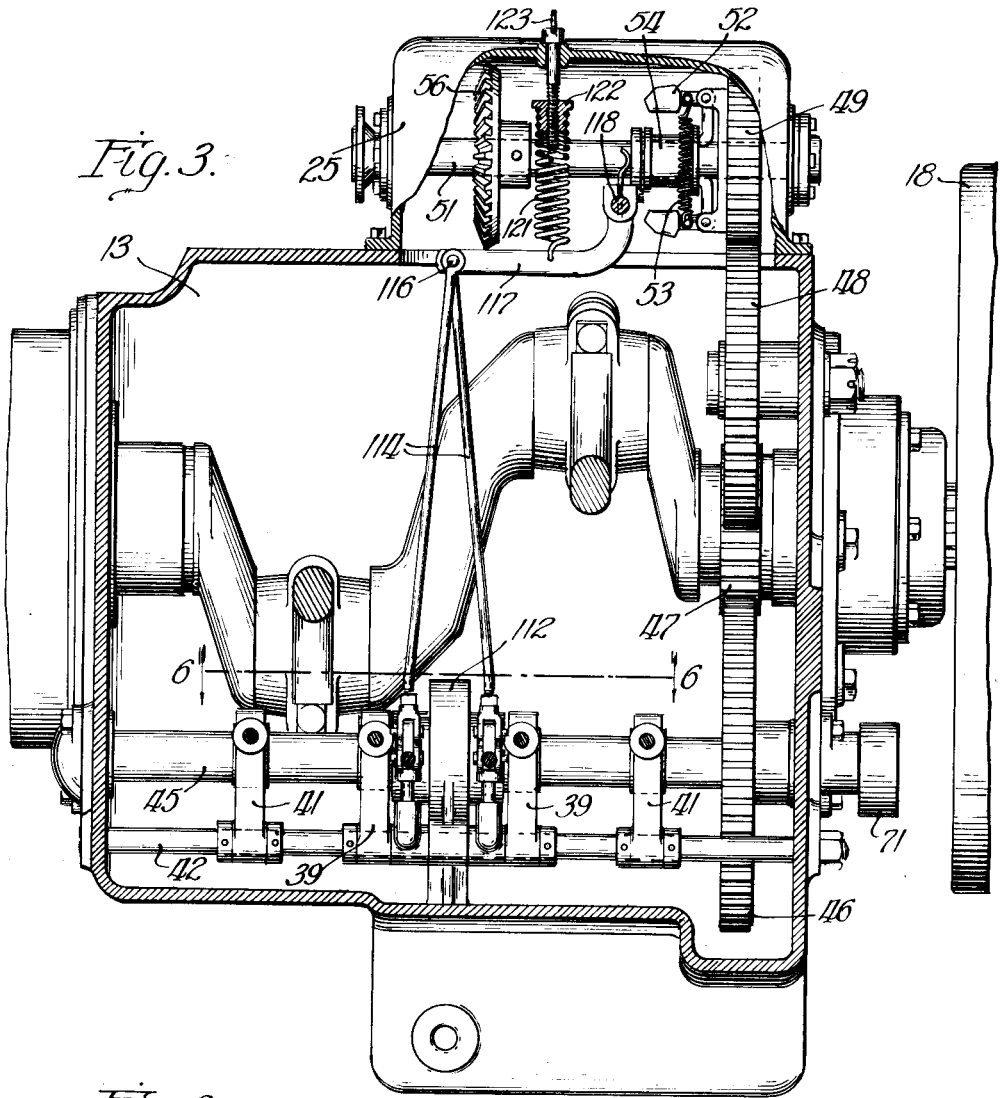
Fig. 3 is a vertical transverse sectional view through the crank case, taken on the plane of the line 3—3 of Fig. 2.
Figure 6:
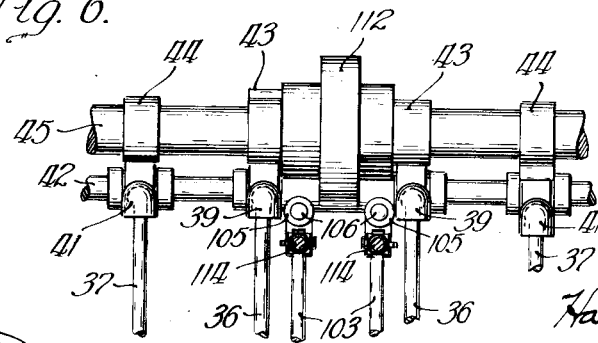
Fig. 6 is a fragmentary plan view taken on the plane of the line 6—6 of Fig. 3, illustrating the cam shaft and the operating parts for actuating the valves and injector devices.
Figure 4:
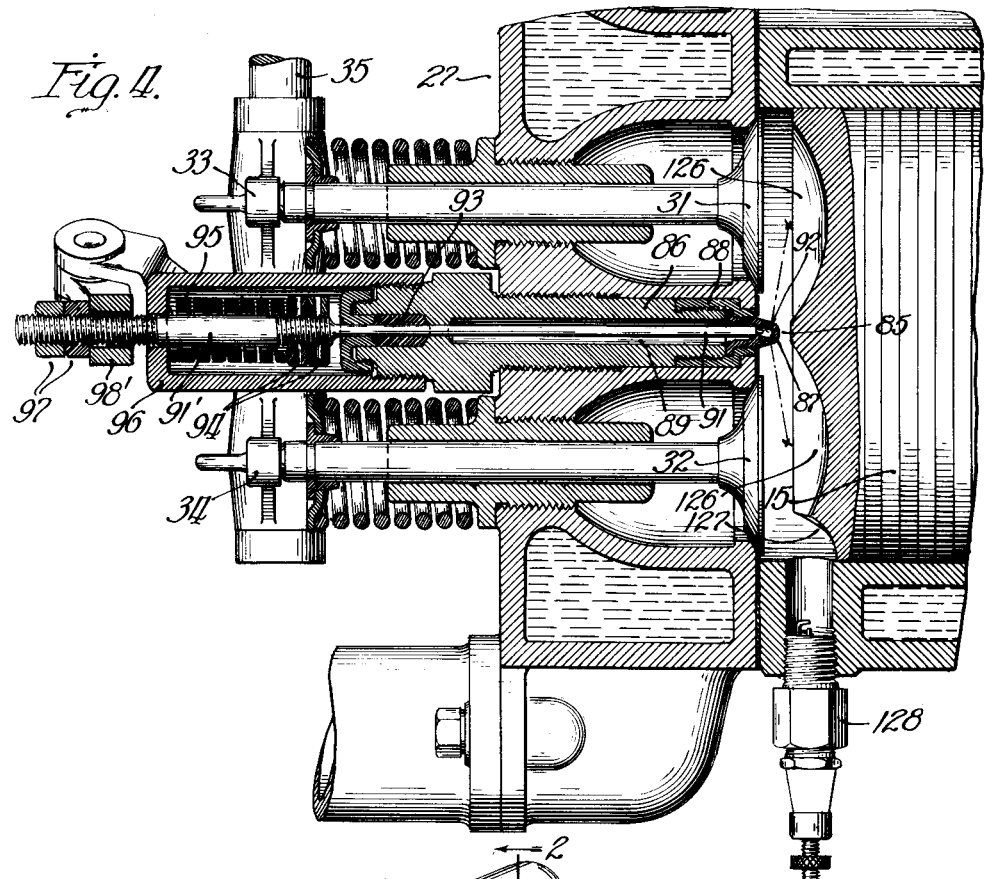
Fig. 4 is a horizontal sectional view through the valve mechanism for one of the cylinders, corresponding to a section taken on the plane of the line 4—4 of Fig. 2.

Referring to Fig. 4, each cylinder is provided with an intake valve 31 and an exhaust valve 32, the stems of which extend forwardly through suitable guides in the removable head and are adapted to be engaged by rocker arms 33 and 34, respectively. These rocker arms are pivotally mounted on a transverse supporting shaft 35 mounted on the head 27, and the lower ends of said arms 33 and 34 are engaged respectively by push rods 36 and 37. The arrangement for the other cylinder is a duplication of that just described, and the two intake valve push rods 36 and the two exhaust valve push rods 37 extend back into the crank case through openings 38, 38' formed in the cylinder head and cylinder block below each cylinder. Referring to Figs. 3 and 6, the rear ends of the two intake valve rods have operative connection with two cam following arms 39 and the rear ends of the two exhaust valve rods have operative connection with two similar arms 41. These arms have pivotal mounting on a transverse shaft 42 supported in the lower portion of the crank case.

Both pairs of follower arms ride against their respective intake and exhaust cams 43 and 44 on a transverse cam shaft 45 which is journaled in the side walls of the crank case. The usual timing gear 46 mounted on the cam shaft meshes with a relatively smaller gear 47 on the crank shaft 14 and transmits the proper speed of rotation to the cam shaft.

The gear 47 also transmits rotation through an idler gear 48 to a gear 49 mounted on a governor shaft 51 which extends transversely within the housing 25. Rotating with said governor shaft are two weighted governor arms 52 which, under the action of relatively high speed, swing outwardly against the tension of a spring or springs 53 and impart endwise movement to a sliding collar 54 mounted on the shaft 51. In the previous spark ignition type of engine such endwise movement of the collar or sleeve 54 was transmitted to a throttle in the intake manifold for reducing the volume of the mixture supplied to the engine. In the present Diesel embodiment, such endwise movement of the sleeve 54 is utilized to vary the stroke of the injectors, as will be presently described. Also mounted on the governor shaft 51 is a bevel gear 56 which meshes with a bevel pinion (not shown) on the fan shaft 24, whereby the fan shaft is driven from this governor shaft.

The ports for the two exhaust valves 32 communicate with separate exhaust passageways 57, 57 formed in a manifold fitting 58 bolted to the top of the cylinder head 27. The ports for the two intake valves 31 communicate with a common intake manifold 59 formed as a part of the fitting 58.

For ordinary gasoline operation, such also being employed for starting purposes in the present embodiment, the intake manifold 59 derives its combustible mixture from a carburetor 61. Fuel for the engine is contained in a fuel tank 62 which extends rearwardly from the radiator 22 over the top of the engine. This tank is divided into two compartments, one for gasoline and the other for heavier fuel for normal running.

The foregoing points out in general the characteristic features of design of the previous type of engine, and also illustrates the general grouping and arrangement of the other related parts of the power plant in this tractor design. I shall now describe the construction and arrangement of the parts embodied in the engine and the modifications made in adapting the tractor to the Diesel principle of operation. Proceeding first along the path of the fuel, the crude oil or fuel oil is fed from the large compartment of the tank 62 through a valve 64 and pipe connections 65 to a filter 66 (Fig. 1). Here the oil is filtered or strained to remove any sediment or foreign matter. From the filter the oil is conducted through a pipe 67 to the inlet port of a high pressure pump 68. Such pump is disposed at the side of the crank case 13 between the fly-wheel 18 and the end wall of the crank case, being rigidly secured to the outer side of said end wall by the three bolts 69. Marked simplicity of construction is obtained by having the engine cam shaft 45 drive this fuel pump, and accordingly this end of the cam shaft is made longer than usual and is extended through the side wall of the crank case and into the hollow base portion 68' of the pump.

Here the cam shaft has a cam 71 mounted thereon, as best shown in Fig. 3, which has direct engagement with the lower end of the plunger in the pump 68. The intake stroke of said plunger is effected by a spring, the cam 71 only operating to force the plunger outwardly in its pressure stroke. The lubricant contained within the crank case may be conducted along the cam shaft out into the hollow base portion 68' for lubricating the cam 71 and the adjacent end of the plunger.

The fuel oil under pressure is discharged through the outlet port of the pump into a pipe 73 which discharges into a small high pressure reservoir 74, preferably mounted on the crankcase 13 in rear of the governor housing 25. Communicating with the reservoir 74, or with the pipe 73, is a pipe 75 which conducts the oil forwardly to the injectors, which will be presently described. Also connecting with the reservoir 74 or pipe line 73 is a high pressure relief valve 76 which connects with a pipe 77 extending forwardly and communicating with the oil supply pipe 65. When the oil pressure established in the reservoir reaches a predetermined maximum, the relief valve 76 opens and allows part of this pressure to be by-passed around through pipe 77 back to the inlet side of the supply system. The predetermined pressure at which this relief occurs can be adjusted by adjusting the spring pressure imposed on the valve, through manipulation of the adjusting stem 78.

Figure 5:
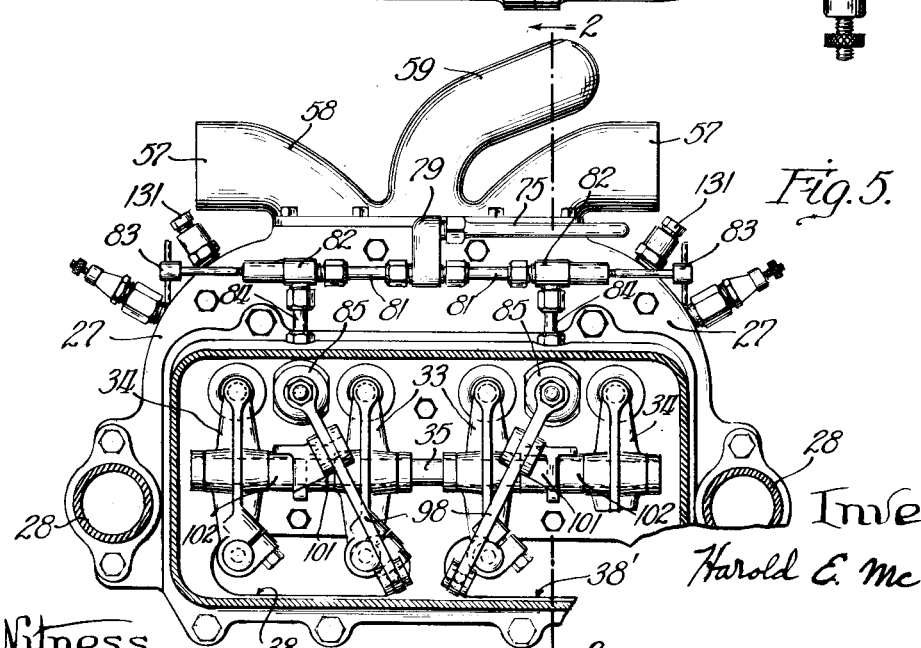
Fig. 5 is a vertical sectional view through the front housing enclosing the valve mechanism, such view being taken approximately on the plane of the line 5—5 of Fig. 1.

Referring to Fig. 5, the pipe 75 conveys the oil to the front end of the engine where it passes through a fitting 79 into the two lateral branch pipes 81, 81 for supplying the two cylinders. Each of said branch pipes connects with a manually operated cut-off valve 82, the valve element of which is moved into and out of closed position by the threaded stem 83. Extending down from each valve is a pipe 84 which conducts the oil to an injector 85 associated with each cylinder. These two injectors are duplicates, the construction thereof being best shown in Figs. 2 and 4. They comprise a sleeve 86 screwing into a hole threaded in the cylinder head 27 between the intake and exhaust valve pockets associated with that cylinder. A nozzle tip 87 is removably secured to the sleeve 86 by a cap 88 engaging over a flange on the tip and threading over a reduced end of the sleeve 86. The oil is discharged from each pipe 84 into an axial duct 89 in the sleeve 86, through which duct a needle valve 91 extends. The inner end of said valve has a conical tip seating on a conical valve seat in the nozzle tip 87. Beyond said valve seat the tip member 87 is provided with two small orifices 92 for projecting the oil laterally to different parts of the combustion chamber.

The outer end of the needle valve 91 passes through an adjustable gland packing 93 in the outer end of the tubular mounting boss or sleeve 86, and beyond said packing the needle valve is formed with an enlarged threaded portion 91'.

Screwing over this enlarged threaded portion are two nuts 94 forming a shoulder for receiving the thrusting pressure of a heavy compression spring 95 which surrounds the enlarged needle valve portion 91'. The outer end of said spring abuts against the closed end of a long tubular cap or sleeve 96 which extends over the spring 95 and screws onto the threaded outer end of the mounting sleeve 86. The enlarged stem portion 91' extends out through a hole in the end of the hollow cap 96, having reciprocable guided support in said hole, and carries two nuts 97 on its threaded outer end. The apertured upper end 98' of a rocker lever 98 engages over the stem portion and contacts with the inner nut 97 in transmitting reciprocating unseating motion to the needle valve 91. The seating of said needle valve is effected by the compression spring 95, the pressure of which is adjustable by screwing the nuts 94 in either direction along the stem portion 91'.

Referring to Fig. 5, the two rocker arms 98 for the two injector mechanisms have their lower ends extending in towards each other for disposing these lower ends on the inner sides of the two innermost valve rocker arms 33. The injector rocker arms 98 are pivotally supported intermediate their ends in the bifurcated ends of suitable supporting brackets 101. The shaft 35 on which the valve rocker arms are pivoted is supported intermediate the pairs of rocker arms in relatively long bosses 102, and the brackets 101 may be formed as extensions from the bosses 102.

Figure 2:
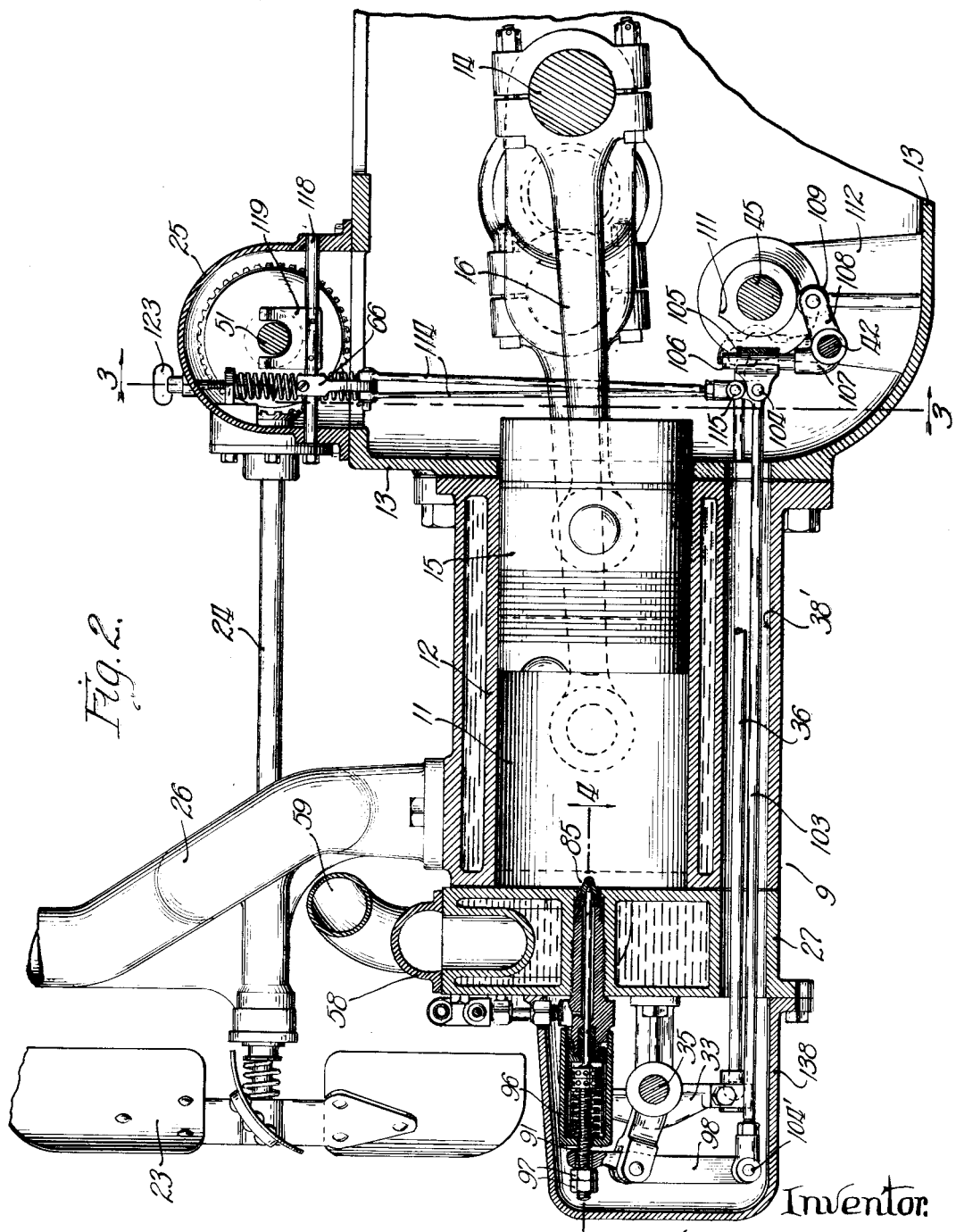
Fig. 2 is a longitudinal vertical sectional view through one of the engine cylinders, corresponding to a section taken on the plane of the line 2—2 of Fig. 5.

Pivotally connected to the lower ends of these two injector rocker arms are two pull rods 103, 103 which extend rearwardly through the openings 38, 38' on the inner sides of the two valve operating push rods 36. Each of such pull rods is pivotally connected at 104 to a sleeve 105 which is slidably mounted on a spindle guide 106 constituting one arm of a bell crank lever 107. The two bell crank levers for the two pull rods are pivotally mounted on the same shaft 42 on which the cam following arms 39 and 41 are mounted. Each bell crank lever comprises an arm 108 extending below the cam shaft 45 and carrying a roller 109 which bears against a cam 111 on the cam shaft. As shown in Fig. 2, each cam 111 has a relatively sharp cam rise of short dwell or interval for effecting a quick, short interval oscillation of the associated injector needle valve 91. These two injector cams are disposed on the cam shaft on opposite sides of an intermediate bearing 112 (Fig. 3) extending upwardly from the bottom of the crank case, the shaft 42 also having intermediate support in this bearing standard 112.

It will be evident that in the operation of the engine the length of stroke transmitted through each pull rod 103 to its associated injector needle will depend upon the length of the effective lever arm from the axis of the shaft 42 to the pivot center 104, and that by shifting the sleeve 105 along the spindle portion 106 the effective length of this lever arm may be varied.

That is to say, by moving the sleeve 105 upwardly along the spindle portion 106, the effective length of the bell crank lever arm transmitting movement to the pull rod 103 is increased, and by moving the sleeve 105 downwardly, the effective length of such lever arm is decreased. This method of varying the stroke of each injector needle valve 91 is utilized to control the speed of the engine under governor control. A control rod 114 extends upwardly from each sleeve 105, being pivotally connected at 115 to a lug extending either from the sleeve or from the end of the pull rod. Referring to Fig. 3, these two control rods are pivotally connected at 116 to a lever 117. Such lever is supported on a pivot shaft 118 extending between the front and rear walls of the governor housing 25. Secured to said shaft, so as to oscillate the arm or lever 117, is a yoke-shaped plate 119 (Fig. 2), the arm portions of which bear against a thrust collar at the end of the sliding governor sleeve 54. A tension spring 121 is connected to the governor arm 117 to act in opposition to the centrifugal governor 52, such spring having its upper end connected to a collar or nut 122, in which an adjusting screw 123 has threaded engagement. Such adjusting screw is actuatable from the outer side of the housing 25, for permitting ready adjustment of the tension of the spring 121.

It will be noted that as the sleeves 105 are moved up or down along the arms 106 of the bell crank levers in governing the speed of the engine, such sleeves and the rear ends of the pull rods 103 swing about the pivots 104' connecting the forward ends of these pull rods to the rocker arms 98, and because of the remote distance of these pivot centers 104' from the sleeves 105 the very slight arcuate movement will not disturb the accuracy of the governor regulation.

The high cylinder compression necessary for Diesel operation may be obtained by either proportioning the length of the cylinder or the length of the piston or by properly forming the removable end head 27. Referring to Fig. 4, the end of the piston is provided with depressions 126 for properly distributing the charge of fuel and the combustion thereof. One side of the piston preferably has a recess 127 formed therein for communicating with the well in which the spark plug 128 is disposed. It will be understood that the electrical ignition from these spark plugs is for starting purposes when the engine is being started on gasoline or one of the more volatile fuels. As shown in Fig. 5, each cylinder is preferably provided with a relief cock 131 for starting or compression governing purposes.

Referring to Fig. 1, the intake manifold 59 has a throttle valve 133 interposed therein between the point where the carburetor 61 supplies its combustible mixture to said manifold and the air intake 134 at the end of the manifold.

An air passageway 135 extends from the air intake end of the manifold to the mixing chamber of the carburetor 61. When the engine is to be started the electrical ignition is turned on and the valve 133 is moved to closed position so that all of the entering air is compelled to pass through the passageway 135 and carburetor 61 for being carbureted with the starting fuel. At this time the cut-off valves 82 for the heavy fuel are closed. After the engine is running and the required pressure has been built up in the reservoir 74 the cut-off valves 82 are opened for admitting the heavy fuel under pressure to the injector valves, and the throttle valve 133 is moved to open position so that substantially all of the air entering through inlet 134 will pass directly to the engine instead of through the carburetor 61. If desired, the supply of lighter fuel to the carburetor 61 may be cut off at this time by the closing of a suitable valve in the carburetor fuel supply line 136. With the engine operating under forced fuel injection, speed regulation thereof may be effected by manipulation of the control handle 78 to vary the pressure on the pressure relief valve 76 to increase or decrease the pressure of fuel injection, or the control screw 123 may be manipulated to increase or decrease the pressure of the spring 121 acting in opposition to the governor 52.

In summarizing the features of the invention, it will be seen that the present construction encloses all of the injector valve operating parts so that they will not be subjected to the abrasive action of dust and dirt.

The operation of the injector valves from injector cams on the conventional cam shaft simplifies the construction, and the disposal of these parts in the crank case insures that the same will always receive ample lubrication. The several valve rocker arms at the front end of the engine are all enclosed in a removable cover 138, and lubricant can pass to the rocker arms through the longitudinal openings 38 and 38' extending below the cylinders. The bottom side of the governor housing 25 is open to the crank case, whereby splash lubrication can reach the governor parts, the lever 117, etc. The arrangement of the pump 68 at the side of the crank case, with its drive from the conventional cam shaft, encloses these driving parts, and the arrangement of the intake manifold 59, filter 66, and pressure reservoir 74, in the relation shown between the fuel tank 62 and the engine, adapts the Diesel parts to the present design of tractor without necessitating extensive changes in such design. While the foregoing constitutes the principal object or objects of the invention, it will be understood that certain features have application to Diesel engines generally irrespective of their use.

Having thus described my invention, what I claim as new and desire to secure by Letters Patent is:—

1. In an internal combustion injection engine having a crank case, a cylinder block extending substantially horizontally from said crank case, said block having two cylinders therein and having longitudinal openings extending below said cylinders from said crank case to the head ends of said cylinders, an air intake and an exhaust valve for each cylinder, a cam shaft within said crank case, intake and exhaust cams mounted on said shaft within said crank case, push rods extending through said longitudinal openings and actuated by said intake and exhaust cams and operatively connected with said valves, the combination of an injector valve for each cylinder governing the admission of fuel thereto, two injector cams disposed adjacent one another on said cam shaft within said crank case, two bell crank levers mounted within said crank case and each having one arm actuated by one of said injector cams, a member slidably mounted on the other arm of each of said levers, pull rods pivotally connected with said members and disposed adjacent one another in said longitudinal openings alongside said push rods, said push rods being operatively connected with said injector valves, and governor means responsive to engine speed and including link means disposed generally in a plane between said cylinders for sliding both of said members relatively to said bell crank levers for governing the stroke of said injector valves.

2. In an internal combustion injection engine having a crank case, two cylinders extending substantially horizontally therefrom, a crank shaft in said crank case, pistons in said cylinders, connecting rods connecting the pistons with said crank shaft, injector valves for said cylinders, the combination of injector rods operatively connected with said valves and extending into said crank case below said connecting rods, a cam shaft disposed below the connecting rods in said crank case, motion transmitting devices between said cam shaft and each of said injector rods, said motion transmitting devices being adjustable to govern the stroke of each injector valve, a governor disposed in the upper part of the crank case and responsive to engine speed, and link connections extending from said governor downwardly between said connecting rods and operatively linked to said motion transmitting devices for automatically controlling the stroke of said injector valves in response to said governor.

3. In an internal combustion injection engine having a crank case, a crank shaft therein, two cylinders extending substantially horizontally from said crank case, pistons in said cylinders, connecting rods extending from said pistons to said crank shaft, an air intake and an exhaust valve for each cylinder, a pair of valve rods for each cylinder, valve rocker arms between the outer ends of each pair of valve rods and the associated pair of intake and exhaust valves for each cylinder, a cam shaft in said crank case, two pairs of valve cams on said cam shaft for actuating the two pairs of valve rods, and an injector valve for each cylinder disposed between the associated intake and exhaust valves, the combination of a pair of injector valve operating rods extending longitudinally of the cylinders and parallel with respect to said two pairs of valve rods, said injector valve operating rods being disposed between said pairs of valve rods, injector rocker arms for transmitting motion from said injector rods to said injector valves, said injector rocker arms extending across the innermost valve rocker arms, and injector cams on said cam shaft between the two pairs of valve cams and adapted ot actuate said injector rods.

4. In an internal combustion injection engine having a crank case, a crank shaft therein, two cylinders extending substantially horizontally from said crank case, pistons in said cylinders, connecting rods extending from said pistons to said crank shaft, an air intake and an exhaust valve for each cylinder, a pair of valve rods for each cylinder, valve rocker arms between the outer ends of each pair of valve rods and the associated pair of intake and exhaust valves for each cylinder, a cam shaft in said crank case, two pairs of valve cams on said cam shaft for actuating the two pairs of valve rods, and an injector valve for each cylinder disposed between the associated intake and exhaust valves, the combination of a pair of injector valve operating rods extending longitudinally of the cylinders and parallel with said two pairs of valve rods, said injector valve operating rods being disposed between said pairs of valve rods, injector rocker arms for transmitting motion from said injector rods to said injector valves, said injector rocker arms extending across the innermost valve rocker arms, a pair of injector cams on said cam shaft between said two pairs of valve cams, motion transmitting devices between said injector cams and said injector rods, said motion transmitting devices being adjustable for governing the stroke of each injector valve, a governor responsive to engine speed disposed adjacent to the upper portion of said crank case substantially vertically above the connecting rods, and link members connected with said governor and extending downwardly between said connecting rods and having operative connection with said motion transmitting devices for automatically governing the stroke of said injector valves in response to said governor.

5. In an internal combustion injection engine having a crank case, two cylinders extending substantially horizontally from said crank case, a valve and valve rod for each cylinder, the rods extending longitudinally of the cylinders, a valve rocker arm between the outer end of each of said valve rods and the associated valve for each cylinder, and a cam shaft for operating the valve rods, the combination of an injector valve for each cylinder positioned adjacent said first mentioned valve, a pair of injector valves operating rods extending longitudinally of the cylinders between said first named rods, injector rocker arms extending across said valve rocker arms for transmitting motion from said injector rods to said injector valves, and means carried by said cam shaft for actuating said injector rods.

6. In an internal combustion injection engine having a crank case, two cylinders extending substantially horizontally therefrom, an air intake and an exhaust valve for each cylinder, a pair of valve rods for each cylinder, and valve rocker arms between the outer ends of each pair of valve rods and the associated pair of intake and exhaust valves for each cylinder, the combination of an injector valve for each cylinder positioned between the two intake and exhaust valves, a pair of injector valve operating rods extending longitudinally of the cylinders between said two pairs of valve rods, injector rocker arms positioned across the inner of said rocker arms for transmitting motion from said injector rods to said injector valves, and common means for actuating both said injector rods and said valve rods.

7. In an internal combustion injection engine having a cylinder, an injector valve governing the admission of fuel thereto, and a cam shaft, the combination of operating mechanism for said valve comprising a valve crank rockably supported adjacent said cam shaft and having one arm disposed adjacent thereto, a cam on said cam shaft operatively associated to swing the bell crank, a sleeve shiftably disposed on the other arm of said bell crank and adapted to swing therewith, means connected to swing therewith and operative to shift said injector valve, and means for shifting said sleeve on the bell crank to govern the stroke of the injector valve.

8. In an internal combustion injection engine having a cylinder, a crank case connected therewith, an injector valve governing the admission of fuel to said cylinder, a cam shaft journaled in the lower part of said crank case, and governor means driven by the engine and disposed in the upper part of said crank case, the combination of operating mechanism for said injector valve comprising a bell crank disposed adjacent said cam shaft and including one arm extending alongside said shaft, a cam mounted on said cam shaft and associated with said arm to swing the bell crank, a sleeve slidably disposed on the other arm of said bell crank, means operatively connecting said sleeve with said injector valve including an operating rod extending substantially at right angles to the last mentioned arm of said bell crank and connected with said sleeve to be rocked thereby when the bell crank is rocked by the operation of said cam shaft, and means connecting said governor mechanism with said sleeve to shift the latter relative to the second arm of the bell crank in accordance with the speed of rotation of the engine, said means including an operating rod connected with the sleeve and extending therefrom in a direction generally parallel with respect to the second arm of the bell crank.

9. In an internal combustion injection engine having a horizontally disposed cylinder, a crank case, a horizontal transversely disposed cam shaft journaled in said crank case, and governor mechanism mounted on the upper part of said crank case and including a shiftable arm disposed above the cylinder, the combination of an injector valve governing the admission of fuel to said cylinder, a cam therefor on said cam shaft, a bell crank lever disposed in the crank case and mounted for rocking movement about an axis disposed parallel with and below the axis of the cam shaft, said bell crank lever including an arm having a roller at one end operatively associated with said cam whereby rotation of the latter rocks the bell crank about its axis, a member slidably mounted on the other arm of said bell crank lever, a rod pivotally connected with said member and extending alongside said cylinder and operatively connected with said injector valve, and a vertically extending rod connected with said member and extending alongside the cylinder and connected with said governor mechanism for shifting said member in response to the speed of the engine for varying the stroke of the injector valve.

HAROLD E. McCRAY.